United States Patent
Rupp

[11] Patent Number: 5,191,852
[45] Date of Patent: Mar. 9, 1993

[54] FISHING BOAT OUTRIGGER DEVICES

[76] Inventor: Herbert E. Rupp, 4761 Anchor Ave., Port Salerno, Fla. 33692

[21] Appl. No.: 859,851

[22] Filed: Mar. 30, 1992

[51] Int. Cl.$^5$ ............................................. B63B 35/14
[52] U.S. Cl. ................................... 114/255; 43/27.4; 248/520
[58] Field of Search ......................... 114/255, 343, 89; 43/27.4; 248/520, 293, 291, 284; 211/99, 100

[56] References Cited

U.S. PATENT DOCUMENTS

| | | | |
|---|---|---|---|
| 4,384,542 | 5/1983 | Wilson | 114/255 |
| 4,632,050 | 12/1986 | Rupp | 114/255 |
| 4,889,064 | 12/1989 | Rupp, III | 114/255 X |
| 4,993,346 | 2/1991 | Rupp | 114/255 |

Primary Examiner—Sherman Basinger
Attorney, Agent, or Firm—Carroll F. Palmer

[57] ABSTRACT

An outrigger device for use with a motorboat upon which the device can be mounted for movement between an inboard storage position and an outboard trolling position includes a tube unit, a position unit moveable relative to the tube unit and a lock unit to releasably prevent such relative movement. The tube unit includes an elongated tube, a first shackle member fixed to its inboard end, a first mounting bracket and a universal joint supporting the shackle member on the first bracket. The position unit includes a V-shaped yoke with clevis members fixed on its ends plus second and third bracket members upon which the clevis members are pivoted. One of such bracket members including a latch to lock the device in an inboard storage position. The lock unit includes a collar through which the elongated tube extends for sliding movement of the collar along the elongated tube and a cam member having a lever extending therefrom by which the cam member may be moved between a lock position which prevents the collar to slide along the tube and an unlock position which permits such collar sliding movement. The device also has a release pin system which allows the outrigger device to be lowered fore or aft for bridge clearance or the like.

3 Claims, 2 Drawing Sheets

FISHING BOAT OUTRIGGER DEVICES

BACKGROUND OF THE INVENTION

1. Field of the Invention

This application relates broadly to fishing equipment. More particularly, it concerns outrigger devices for use with fishing boats, especially open type motorboats having a cuddy cabin.

2. Description of the Prior Art

In sportfishing operations, a conventional procedure is to troll fishing lines astern of the fishing boat from outrigger devices that hold the lines spaced apart a sufficient distance to prevent them from becoming entangled with one another due to the movement of the boat or the action of the sea.

Typically, each outrigger device includes an elongated tubular unit, e.g., 10–30 ft. long, having its inboard end fastened in some manner to the fishing boat so that it can be moved from a stowage position while the boat is not actually engaged in fishing, i.e., underway to or from the fishing grounds, to a trolling position while the boat is engaged in fishing.

On large, offshore type sportfishing boats, the outrigger devices are typically of the tubular, cable-trussed, mast type pivoted by their inboard ends upon a vertical portion of the cabin or other boat superstructure and have associated boom elements to enable the outrigger to be firmly held in the stowage or trolling position while permitting easy movement between such separated positions (see U.S. Pat. No. 4,632,050).

On smaller fishing boats, often powered by outboard motors, the outrigger devices are less complicated than the tubular mast type used on the offshore, sportfishing boats. Typically, such outriggers comprise only a single piece of tubing, often tapered, pivoted by the inboard end to the gunwale or equivalent horizontal surface of the boat (see U.S. Pat. No. 3,008,259).

One style of the smaller fishing boats that is very popular because the layout of such boats provides a large area of cockpit sole for use by boat occupants during fishing, is the so-called "center console" type. An improved form of outrigger device for use with such motorboats equipped with T-tops has been developed (see U.S. Pat. No. 4,993,346).

The present invention further advances the art of outrigger design by providing outrigger devices of relatively simple construction particularly useful on sportfishing boats of the 20–30 foot type equipped with a cuddy cabin or equivalent type motorboats.

OBJECTS

A principal object of the invention is the provision of new forms of outrigger systems for use with motorboats.

Further objects include the provision of:

1. Sportfishing boat outrigger devices that are easy to operate, tough and dependable.

2. Such devices having lever action locking to provide smooth, trouble free performance when laying out an outrigger for fishing or laying it down for bridge clearance.

3. Such devices that can operate with straight, un-trussed poles or with trussed poles generally of about 15 to 23 foot length.

4. Such devices that can be preset for quick movement of the outrigger pole from a inboard storage position to an outboard trolling position and vis versa.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished in accordance with the invention by the provision of an outrigger device for use with a motorboat having a cabin with an upwardly extending cabin wall upon which the device can be mounted for movement between an inboard storage position and an outboard trolling position.

The outrigger device comprises a tube unit, a position unit moveable relative to the tube unit and a lock unit to releasably prevent the relative movement between the tube unit and the position unit.

The tube unit includes an elongated tube defined by a an inboard end portion and an outboard end portion integrally joined together by a straight central portion. A first shackle member is fixed to the inboard end portion, there is a first bracket member for mounting on a cabin wall or other portion of the motorboat and a universal joint mounts the shackle member on the first bracket member.

The position unit includes a V-shaped yoke defined by first and second end portions integrally joined together by an arcuate central portion. Clevis members are fixed to such first and second end portions and there are second and third bracket members upon which the clevis members are pivoted.

The second bracket member includes latch means to engage the first end portion of the yoke to lock the device in its inboard storage position.

The lock unit includes a collar defined by first and second U-shaped straps hinged together at one of their ends and having tongues extending from the other of their ends. The elongated tube of the tube unit extends through the collar for sliding movement of the collar along the elongated tube.

The first strap of the collar carries a laterally extending second shackle, a lug having a bore therein is fixed to the arcuate central portion of the yoke and a pin extends through the lug bore and the second shackle to releasably fasten the lock unit to the position unit.

The tongues collar straps have transverse bores therein through which a bolt extends and a cam member carried by the bolt. Such cam member has a lever extending therefrom by which the cam member may be moved between a lock position which prevents the collar from sliding relative to the elongated tube and an unlock position which permits such collar sliding movement.

A ring is carried on the straight central portion of the elongated tube to function as stop means to limit the movement of the device into its outboard trolling position.

Preferably, the latch means includes first and second posts extending from the second bracket member and a bar having a transverse bore therein at one end and a C-opening in its other end is pivoted at the one end to the first post for movement of the C-opening into contact with the second post.

BRIEF DESCRIPTION OF THE DRAWINGS

A more complete understanding of the invention can be obtained by reference to the accompanying drawings in which.

DESCRIPTION OF THE PREFERRED EMBODIMENTS

Figure 1:
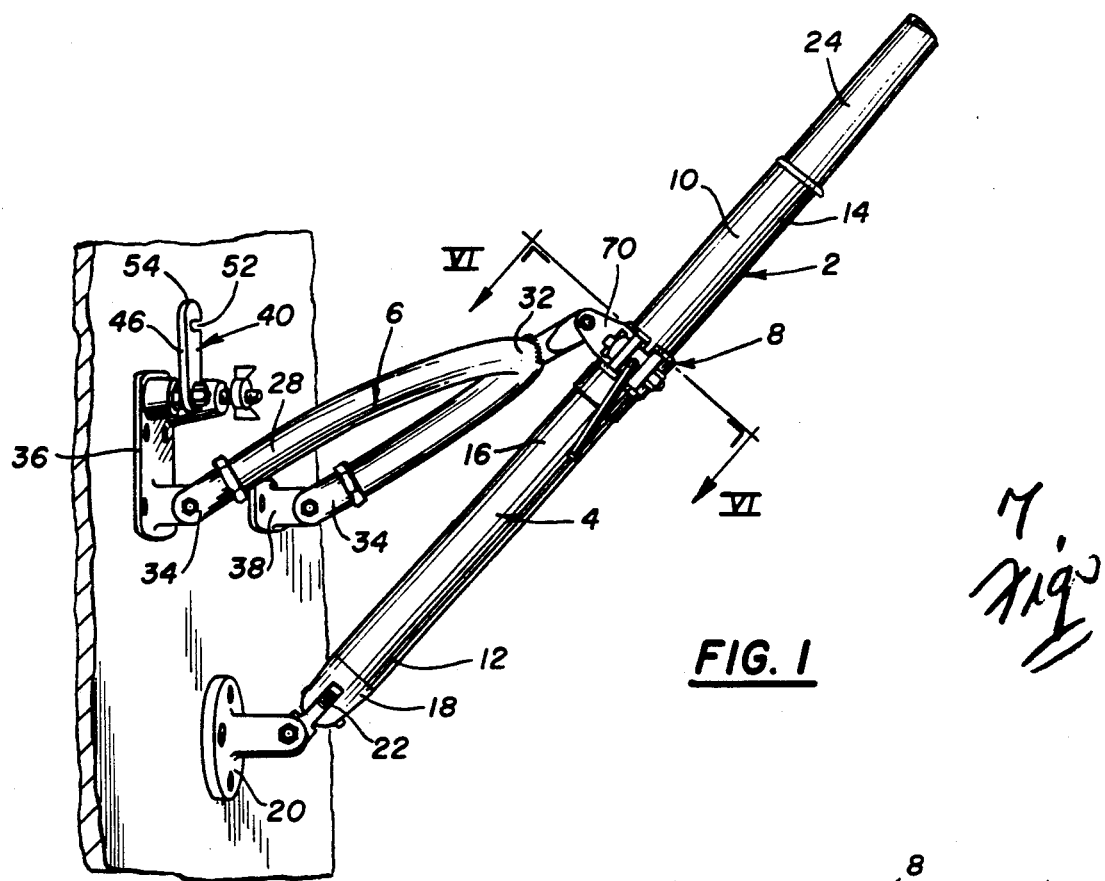
FIG. 1 is an isometric view of an outrigger device of the invention.
Figure 6:
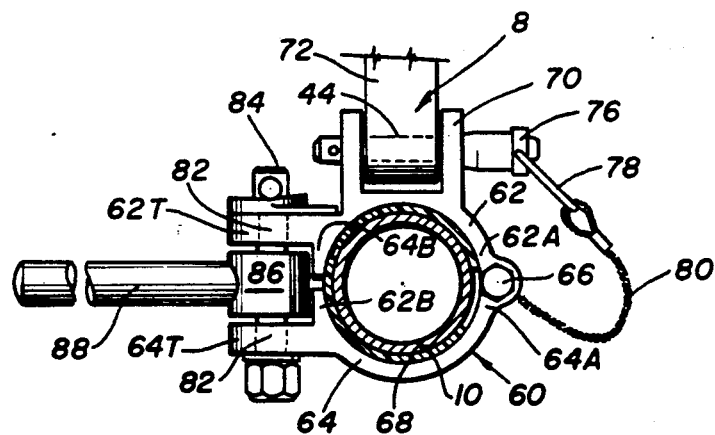
FIG. 6 is a sectional view taken on the line VI—VI of FIG. 1.
Figure 7:
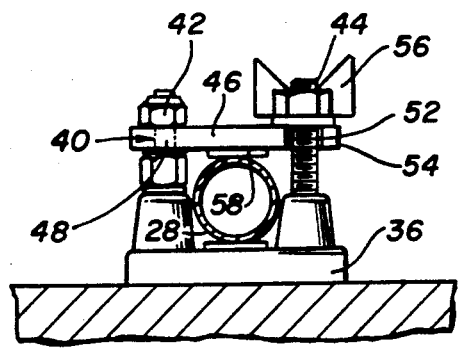
FIG. 7 is a sectional view taken on the line VII—VII of FIG. 2.

Referring in detail to the drawings in which identical parts are identically numbered, the outrigger device 2 of the invention comprises a tube unit 4, a position unit 6 moveable relative to the tube unit 4 and a lock unit 8 that can be operated to prevent relative movement between the tube unit 4 and the position unit 6.

The tube unit 4 includes an elongated tube 10 having an inboard end portion 12 and an outboard end portion 14 integrally joined together by a straight central portion 16.

A shackle member 18 is fixed to inboard end portion 12 and the shackle member 18 is mounted on a first bracket member 20 by a universal joint 22. The outboard end portion 14 receives and holds the outrigger pole 24.

Figure 3:
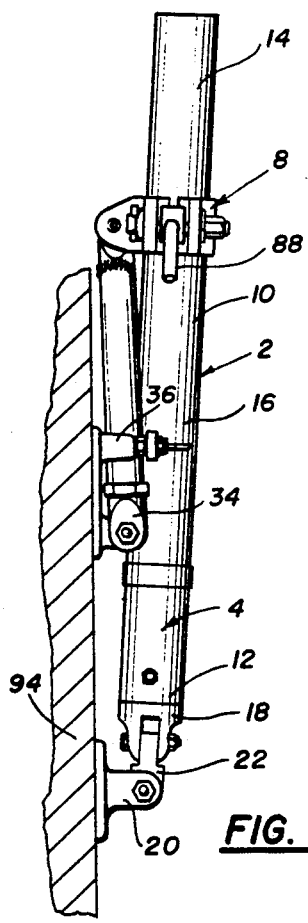
FIG. 3 is a lateral view of the the outrigger device of FIG. 1 locked in its inboard, storage position.

The position unit 6 includes a V-shaped yoke 26 defined by first end portion 28 and second end portion 30 integrally joined together by an arcuate central portion 32. Clevis members are fixed to the first and second end portions and are pivoted on second and third bracket members 36 and 38, respectively. The bracket member 36 includes latch means 40 to engage the yoke end portion 28 to lock the device 2 in the inboard storage position (FIG. 3).

The latch means 40 includes a first post 42 and a second post 44 extending from the second bracket member plus a bar 46 having a transverse bore 48 therein at one end 50 and a C-opening 52 in its other end 54. The bar 46 is pivoted at end 50 on post 42 for movement of the C-opening 52 into contact with the post 44. Advantageously, post 44 is threaded and carries a wing nut 56 to force the anvil 58 on bar 46 against yoke end portion 28 to lock the position means 6 in the inboard position (FIG. 3).

The lock unit 8 has a collar 60 comprising first and second U-shaped straps 62 and 64, respectively, hinged together at one of their ends 62A and 64A by bolt 66. The other of their ends 62B and 64B have tongues 62T and 64T extending therefrom.

The elongated tube 10 extends through collar 60 and the plastic bushing 68 for sliding movement of the collar and bushing along the elongated tube.

The first strap 62 carries a laterally extending second shackle 70 and a lug 72 having a bore 74 therein is fixed, such as by welding, to the arcuate central portion 32 of the yoke 26.

Figure 5:
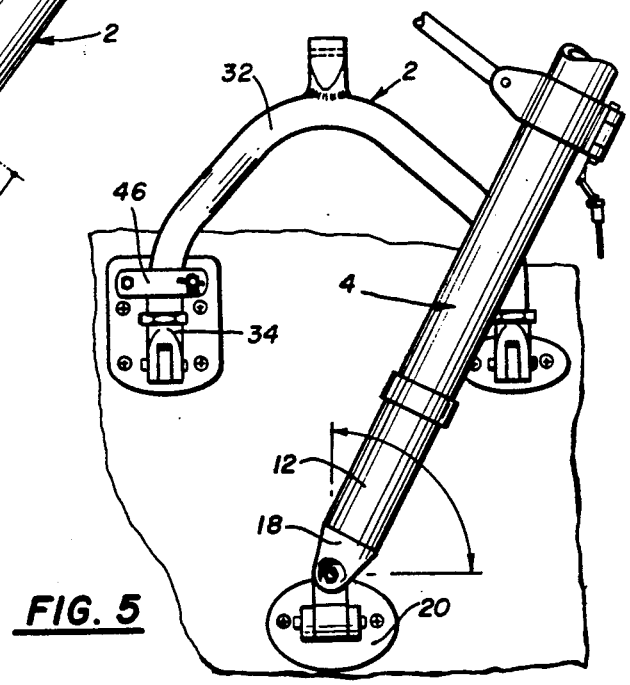
FIG. 5 is a view similar to FIG. 2, but with the pole section of the outrigger device being lowered forward such as to pass under a bridge.

A quick-release pin 76 extends through bore 74 and shackle 70 to releasably fasten the lock unit 8 to the position 6. Thus, removal of the pin 76 (FIG. 5) enables the tube unit 4 to disconnect from the positon unit 6 so the tube unit 4 and outrigger pole 24 can swivel on the universal joint 22 to lay forward on the deck of the motorboat (not shown), such as when passing under a bridge that is not high enough to permit the boat to otherwise pass.

Advantageously, the pin 76 includes a ring 78 and lanyard 80 to prevent it from falling overboard when out of the bore 74.

The tongues 62T and 64T have transverse bores 82 therein through which a bolt 84 extends and a cam member 86 having a lever 88 extending therefrom is carried by the bolt 84. The cam member 86 may be moved between a lock position (see FIG. 3) which prevents the collar sliding movement and an unlock position (see FIG. 2) which permits the collar 60 to slide along the tube 10.

Figure 4:
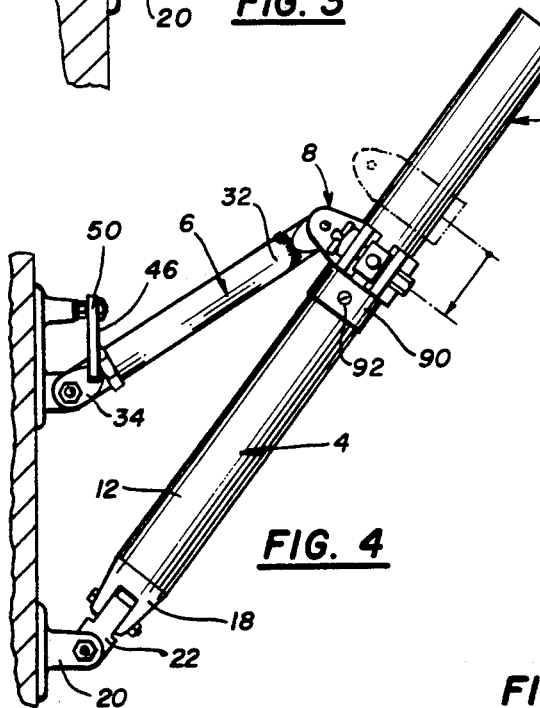
FIG. 4 is a lateral view the outrigger device of FIG. 1 locked in its outboard, trolling position.

Ring 90 carried on the straight central portion 16 of the elongated tube 10 and positioned thereon by screw 92 to function as stop means to limit the movement of the device 2 into the outboard trolling position (see FIG. 4).

Figure 2:
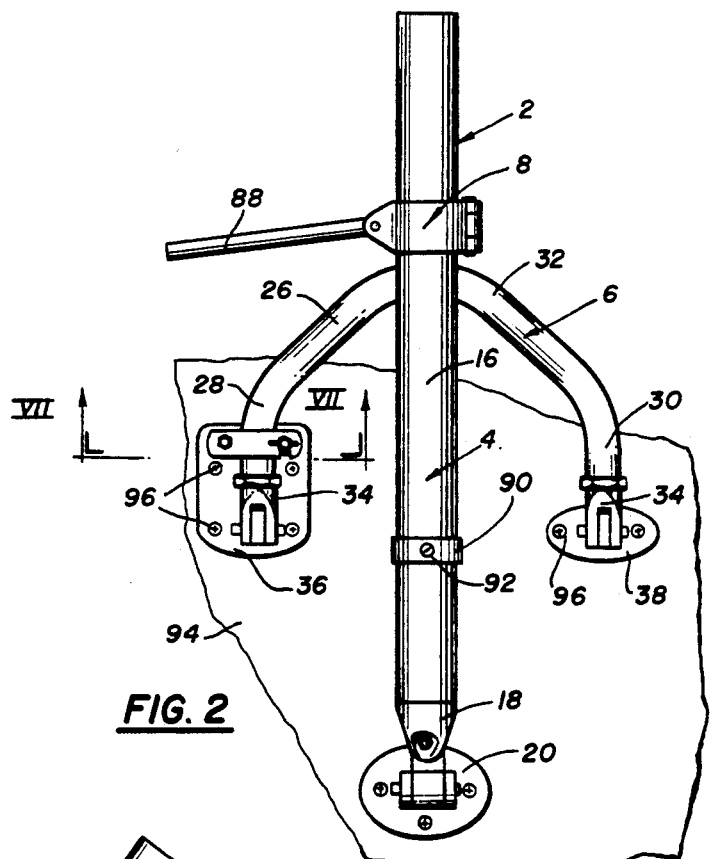
FIG. 2 is a plan view of the outrigger device of FIG. 1.

The device 2 is typically mounted on an upwardly extending web 94 of a boat (not shown), e.g., cuddy cabin wall, by suitable fasteners 96 that pass through the brackets 20, 36 and 38. The new outrigger devices when so installed are easy to operate. Thus, with the device 2 locked in the inboard, storage position, the lock unit 8 is unlocked by movement of lever so it extends normal to the tube 10 (FIG. 2). This allow the tube 10 to be moved outboard (FIG. 4) to the extent permitted by the stop ring 90, whereupon the lock unit 8 is again locked by movement of the lever back toward the tube 10 (FIG. 1). This then permits lines (not shown) to be trolled from the outrigger pole 24 in conventional manner. Following a fishing session, the device 2 with pole 24 can be quickly and easily returned to the inboard, storage position (FIG. 3) by simple, repeated manipulation of the lock unit 8.

If the device 2 with pole 24 needs to be lowered and decked forward to pass an obstruction, e.g., drawbridge, this is easily accomplished by removal of the pin 76 as explained supra.

I claim:

1. An outrigger device for use with a motorboat having an upwardly extending wall upon which said device can be mounted for movement between an inboard storage position and an outbourd trolling position, said device comprising:

a tube unit, a position unit moveable relative to said tube unit and a lock unit to releasably prevent said relative movement, said tube unit including:

an elongated tube defined by a an inboard end portion and an outboard end portion integrally joined together by a straight central portion, a first shackle member fixed to said inboard end portion, a first bracket member for mounting on said wall, and a universal joint mounting said shackle member on said first bracket member, said position unit including:
a V-shaped yoke defined by first and second end portions integrally joined together by an arcuate central portion,
clevis members fixed to said first and second end portions,
second and third bracket members upon which said clevis members are pivoted, said second bracket member including latch means to engage said first end portion to lock said device in said inboard storage position, and said lock unit including:
a collar defined by first and second U-shaped straps hinged together at one of their ends and having tongues extending from the other of their ends,
said elongated tube of said tube unit extending through said collar for sliding movement of said collar along said elongated tube,
said first strap carrying a laterally extending second shackle,
a lug having a bore therein fixed to said arcuate central portion of said yoke,
a pin extending through said bore and said second shackle to releasably fasten said lock unit to said position unit,
said tongues having transverse bores therein through which a bolt extends, and
a cam member carried by said bolt having a lever extending therefrom by which said cam member may be moved between a lock position which prevents said collar sliding movement and an unlock position which permits said collar sliding movement.

2. The device of claim 1 including a ring carried on said straight central portion of said elongated tube to function as stop means to limit the movement of said device into said outboard trolling position.

3. The device of claim 1 wherein said latch means includes first and second posts extending from said second bracket member and a bar having a transverse bore therein at one end and a C-opening in its other end, said bar being pivoted at said one end to said first post for movement of said C-opening into contact with said second post.

* * * * *